(12) United States Patent
Matsushita

(10) Patent No.: US 12,049,184 B2
(45) Date of Patent: Jul. 30, 2024

(54) OCCUPANT RESTRAINT DEVICE

(71) Applicants: Autoliv Development AB, Vargarda (SE); Tetsuya Matsushita, Kanagawa (JP)

(72) Inventor: Tetsuya Matsushita, Kanagawa (JP)

(73) Assignee: AUTOLIV DEVELOPMENT AB, Vargarda (SE)

(*) Notice: Subject to any disclaimer, the term of this patent is extended or adjusted under 35 U.S.C. 154(b) by 113 days.

(21) Appl. No.: 17/632,459

(22) PCT Filed: Jul. 6, 2020

(86) PCT No.: PCT/JP2020/026375
§ 371 (c)(1),
(2) Date: Feb. 2, 2022

(87) PCT Pub. No.: WO2021/024668
PCT Pub. Date: Feb. 11, 2021

(65) Prior Publication Data
US 2022/0274555 A1    Sep. 1, 2022

(30) Foreign Application Priority Data
Aug. 7, 2019  (JP) .................... 2019-145602

(51) Int. Cl.
*B60R 21/207* (2006.01)
*B60R 21/01* (2006.01)
(Continued)

(52) U.S. Cl.
CPC ...... *B60R 21/207* (2013.01); *B60R 21/23138* (2013.01); *B60R 21/2338* (2013.01);
(Continued)

(58) Field of Classification Search
CPC ............ B60R 21/207; B60R 21/23138; B60R 21/2338; B60R 2021/01245; B60R 2021/23386
See application file for complete search history.

(56) References Cited

U.S. PATENT DOCUMENTS 6,688,641 B2 *   2/2004   Dominissini ......... B60R 21/232
                                                    280/730.2
6,874,208 B2 *   4/2005   Wong .................. B60R 21/2338
                                                    24/265 AL
(Continued)

FOREIGN PATENT DOCUMENTS

JP    2014-034356 A    2/2014
JP    2014-51138 A     3/2014
(Continued)

OTHER PUBLICATIONS

WO-2019107398-A1 (machine translation) (Year: 2019).*
Korean Office Action regarding Patent Application No. 1020227007005, dated Aug. 29, 2023.

*Primary Examiner* — Jason D Shanske
*Assistant Examiner* — Joselynn Y Sliteris
(74) *Attorney, Agent, or Firm* — Harness, Dickey & Pierce, P.L.C.; Stephen T. Olson

(57) ABSTRACT

An occupant restraining device capable of accurately adjusting the position of an airbag that expands and deploys. An occupant restraining device comprising an airbag installed in a seatback frame, provided with bands that pulls said airbag, which expands and deploys, to the center of said frame; said bands being in a position where the first portion, a twisting portion, is attached to the upper part of said frame and is twisted in a width direction relative to the second portion.

11 Claims, 6 Drawing Sheets

(51) Int. Cl.
*B60R 21/231* (2011.01)
*B60R 21/2338* (2011.01)

(52) U.S. Cl.
CPC ............... *B60R 2021/01245* (2013.01); *B60R 2021/23386* (2013.01)

(56) References Cited

U.S. PATENT DOCUMENTS

| | | | | |
|---|---|---|---|---|
| 7,621,561 | B2 * | 11/2009 | Thomas | B60R 21/233 280/743.2 |
| 7,712,774 | B2 * | 5/2010 | Garner | B60R 21/213 280/730.2 |
| 9,663,061 | B2 * | 5/2017 | Mihm | B60R 21/23138 |
| 10,144,385 | B2 * | 12/2018 | Alarcon Hernandez | B60R 21/23138 |
| 10,906,495 | B2 * | 2/2021 | Nagasawa | B60R 21/2338 |
| 11,214,224 | B2 * | 1/2022 | Saito | B60N 2/42745 |
| 11,235,729 | B2 * | 2/2022 | Hwangbo | B60R 21/2338 |
| 11,351,950 | B2 * | 6/2022 | Sandinge | B60R 21/2338 |
| 2020/0406855 | A1 * | 12/2020 | Saito | B60R 21/2338 |

FOREIGN PATENT DOCUMENTS

| | | | |
|---|---|---|---|
| WO | 2019/107073 | A1 | 6/2019 |
| WO | 2019/107398 | A1 | 6/2019 |

* cited by examiner

OCCUPANT RESTRAINT DEVICE

TECHNICAL FIELD

The present invention relates to an occupant restraining device provided with an airbag.

BACKGROUND ART

Airbag devices have become widely used in recent years. An airbag device is a safety device which is operated in case of an emergency such as a vehicle collision and, for example, expands and deploys to protect the occupant. There are various types of airbag devices depending on the installation site and application.

For example, the occupant protecting device of Patent Document 1 discloses side airbags that are provided on both sides of a vehicle seat and expand and deploy to the sides of the occupant.

RELATED ART DOCUMENTS

Patent Documents

Patent Documents 1: Japanese Unexamined Patent Application 2014-034356

SUMMARY OF THE INVENTION

Problem to be Solved by the Invention

Furthermore, a technique for adjusting the position of an expanding and deploying airbag using a band is also known. In this technology, when the airbag is expanded and deployed, the band pulls the airbag toward the occupant. However, since a band is used, a problem of band entanglement may occur when such an adjustment is executed. However, the occupant protecting device of Patent Document 1, as described above, does not devise a solution for such a problem.

In light of such circumstances, an object of the present invention is to provide an occupant restraining device which can prevent the band from becoming entangled when adjusting the position of an expanding and deploying airbag using the band.

Means for Solving the Problem

The occupant restraining device according to the present invention is an airbag installed in a frame of a seatback, and is provided with a band that pulls said airbag, which expands and deploys, to the center of said frame; said band being in a position where the first portion, a twisting portion, is attached to the upper part of said frame and is twisted in a width direction relative to the second portion.

Effects of the Invention

With the present invention, the band can be prevented from becoming tangled when the position of the expanding and deploying airbag is adjusted using the band.

DESCRIPTION OF THE PREFERRED EMBODIMENT

The occupant restraining device according to the embodiment of the present invention will be described in detail below according to the diagrams. The occupant restraining device according to the embodiment of the present invention is equipped to a seat of a vehicle.

Embodiment 1

Figure 1:
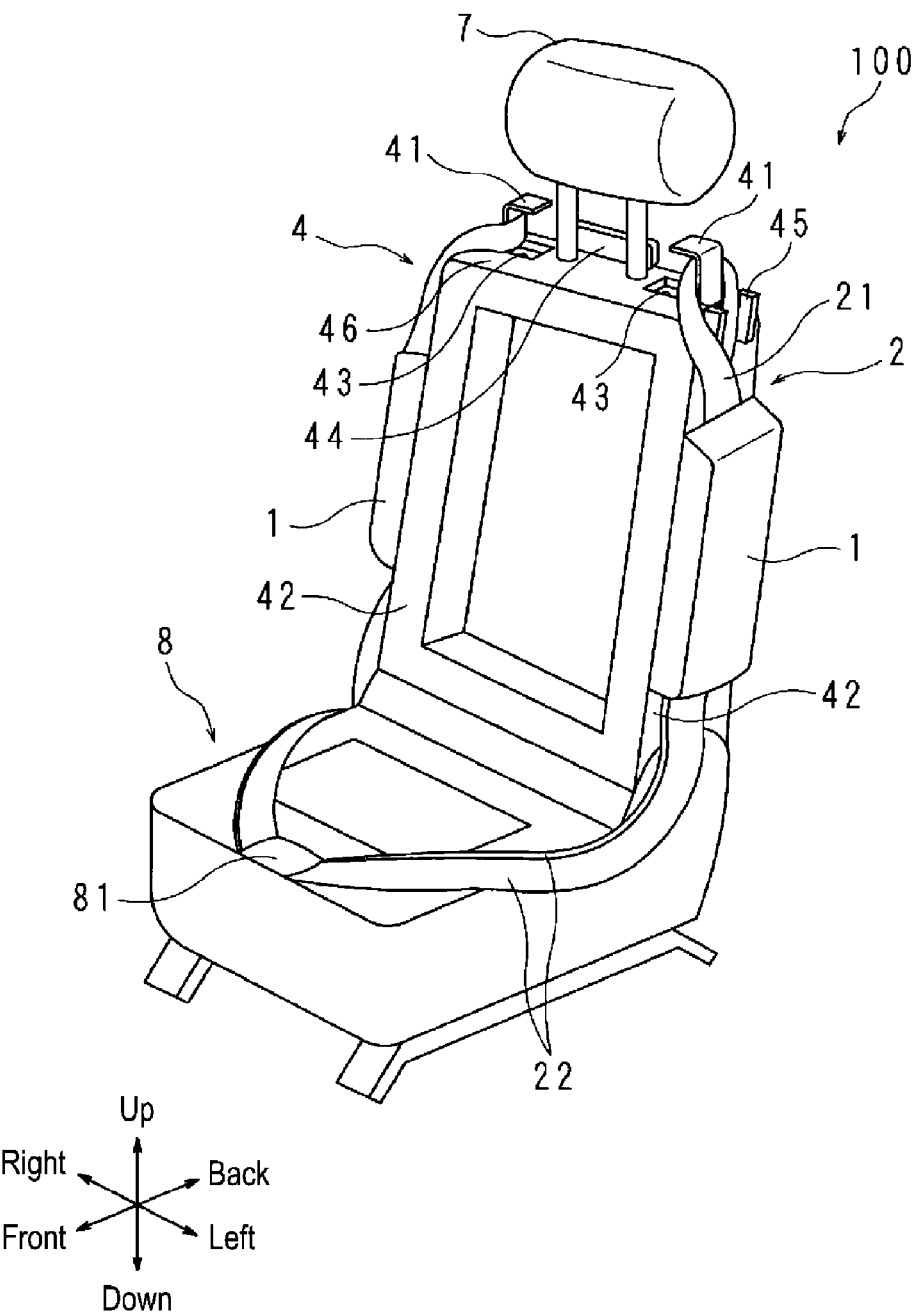
FIG. 1 illustrates a case where the occupant restraining device according to the present invention is attached to a seat.

FIG. 1 illustrates a case where the occupant restraining device 100 according to the present invention is attached to a seat. In FIG. 1, for convenience of explanation, only the frame of the seat is illustrated, excluding the seat skin and the inner cushion material.

The frame of the seat has a seatback frame 4 and a seating frame 8. The seatback frame 4 and the seating frame 8 are rectangular.

In the following, when an occupant sits in the aforementioned seat normally, the area close to the right shoulder of the occupant is referred to as the right side of the seatback frame 4, and the area close to the left shoulder of the occupant is referred to as the left side of the seatback frame 4, and the occupant is seated on the front side of the seatback frame 4. A headrest 7 is provided on the upper side of the seatback frame 4.

An occupant restraining device 100 includes an airbag module 1. The airbag module 1 is provided on the outside of the long side frame 42 on both right and left sides of the seatback frame 4, respectively. FIG. 1 illustrates a case in which the airbag module 1 is provided in both long side frames 42 of the seatback frame 4. However, it is not limited to this and the airbag module 1 can be provided in only one of the long side frames 42.

The airbag module 1 contains an airbag 3 to be described later and an inflator (not shown) which receives an output signal from a sensor and discharges gas, and the like. The airbag 3 is made up of, for example, the circumference of two base materials sewn together to form a bag shape, and the inflator is arranged inside the airbag 3. The occupant restraining device 100 protects the occupant by deploying the airbag 3 in the front direction of the seat during a vehicle collision. The tension band 2 described below is sewn at the upper and lower middle points of the airbag 3 and the airbag 3 is restrained by the tension band 2. In other words, the airbag module 1 has stowed the airbag 3, an inflator, and a portion of the tension band 2.

The occupant restraining device 100 further includes a tension band 2. The tension band 2 is a band having a prescribed width, and is provided in two pieces, one on the left side and the other on the right side of the seatback frame 4. The two tension bands 2 are brought together at the first end 21 (one part) to form a single piece. With the tension band 2, the first end 21 is attached to the upper part of the seatback frame 4.

A second end portion 22 of each tension band 2 is attached to a mounting portion 81 of the seating frame 8. The mounting portion 81 includes, for example, two metal plates, and the second end portion 22 of each tension band 2 is sandwiched between such metal plates. Also, the mounting portion 81 may have a slit and the second end portion 22 of each tension band may be secured in this slit.

Note, securing not limited thereto. Loops may be formed respectively at the tip of the second end portion 22 of the left side tension band 2 and at the tip of the second end portion 22 of the right side tension band 2 and the loops may be secured by hooking them to hooks provided on the seating frame 8.

When the airbag 3 expands and deploys, the tension band 2 pulls the airbag 3 toward the center of the seatback frame 4, that is, toward the occupant sitting in the seat. The middle part of the tension band 2 is stowed in the airbag module 1.

In the upper part of the seatback frame 4, mounting portion 45 for attaching the first end 21 of the tension band 2 are provided at both ends in the left and right directions, respectively. A headrest 7 is provided on the upper short side frame 46 of the seatback frame 4. Further, on the short side frame 46 of the seatback frame 4, a hooking portion 41 that hooks the first end 21 of the tension band 2 is provided on both sides in the left-right direction. In other words, the hooking portion 41 is provided in the upper part of the seatback frame 4 (long side frame 42). The first end 21 of each tension band 2 is hooked to a respective hooking portion 41 in the middle.

Figure 2:
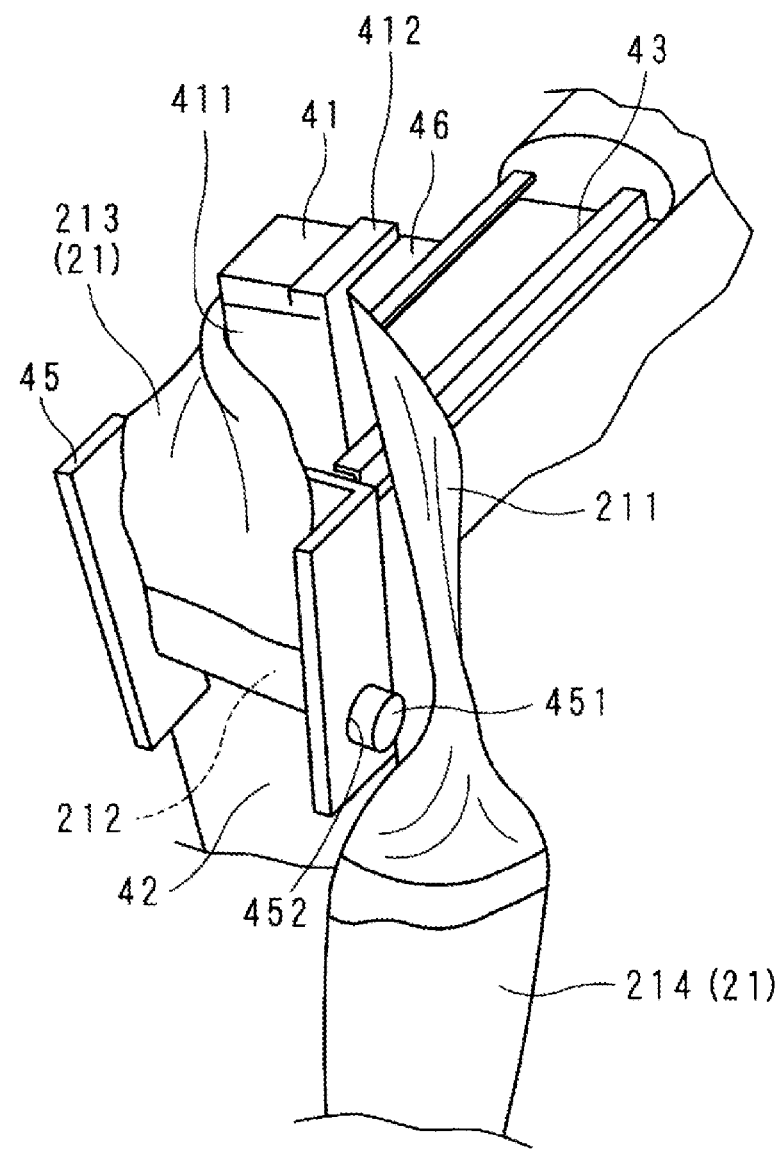
FIG. 2 illustrates an enlarged view of the right side of the seatback frame of the occupant restraining device of the present invention.
Figure 3:
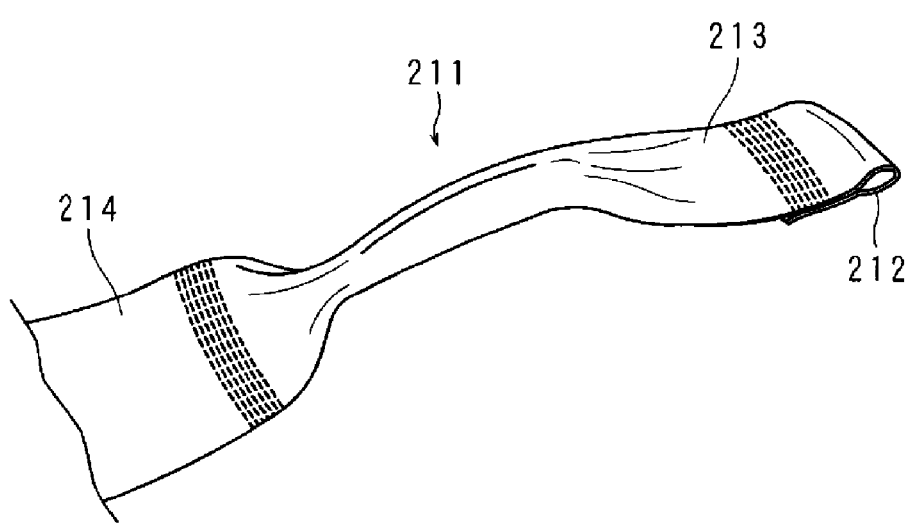
FIG. 3 is a perspective view of a first end of a tension band in the occupant restraining device according to the present invention.

FIG. 2 is an enlarged view of the right side of the seatback frame 4 of the occupant restraining device 100 according to the present invention. FIG. 3 is a perspective view of a first end 21 of a tension band 2 in the occupant restraining device 100 according to the present invention.

In the long side frame 42 on the right side of the seatback frame 4, a mounting portion 45 is provided at the upper end, as described above. The mounting portion 45 has a gutter shape, for example, extending in the vertical direction. Through holes 452 are respectively formed in the mounting portion at the lower ends of both corresponding walls. The two through holes 452 are formed at positions that mutually align. A securing pin 451 for attaching the first end 21 is inserted into the two through-holes 452.

In this embodiment, a case where the mounting portions 45 are provided on the left and right end surfaces of the left and right long side frames 42 respectively will be described, but this is not limited thereto. For example, the mounting portions 45 may be provided on the backside of the left and right long side frames 42 (seatback frame 4).

In other words, as illustrated in FIG. 3, the first end 21 of the tension band 2 is folded and sewn in two, as the tip is folded along the width direction thereof. This forms a mounting loop 212 at the end of the first end 21. After the securing pin 451 has been inserted through the first through-hole 452, the pin passes through the mounting loop 212, and then is inserted through the second through-hole 452, and thus the first end 21 is attached to the mounting portion 45.

The first end 21 is mounted in such a manner that the tip extends through the upper open end of the mounting portion 45 to the hooking portion 41. The first end 21 is hooked onto the hooking portion 41, folded back, and extends to the airbag module 1.

The first end 21 has a twisting portion 211 in the middle. The twisting portion 211 is formed over a prescribed range in the longitudinal direction of the first end 21. A first wide portion 213 is formed on the mounting loop 212 side with respect to the twisting portion 211 and a second wide portion 214 is formed on the opposite side. The first wide portion 213 and the second wide portion 214 are wider than the twisting portion 211 and are equal in width to, for example, the second end portion 22 of the tension band 2. In other words, the twisting portion 211 is narrower than the other portions (first wide portion 213 and second wide portion 214). The twisting portion 211 is a portion whose width is narrowed by, for example, sewing the first end 21 into two folds along the longitudinal direction or sewing it into three folds.

The twisting portion 211 is in a position where the width direction thereof is twisted with respect to the second portion with regards to the first end 21 (tension band 2). In other words, the thickness direction of the twisting portion 211 differs from that of the second portion, and the thickness direction of the twisting portion 211 intersects the thickness direction of the second portion. That is, the direction along the surface of the twisting portion 211 and the direction along the surface in the second portion intersect each other. For example, in embodiment 1, the direction along the surface of the twisting portion 211 and the direction along the surface of the second portion are orthogonal. (See FIG. 3).

The occupant restraining device 100 further includes hooking portions 41. The hooking portions 41 are provided at both ends in the left-right direction in the short side frame 46 of the seatback frame 4, as described above. Each of the hooking portions 41 protrudes, upwardly, that is to say, along the longitudinal direction of the long side frame 42. Each hooking portion 41 is, for example, L-shaped, and has a contact part 411 that makes surface contact with the first end 21 (twisting portion 211), and a detachment prevention part 412 that is bent toward the center of the seatback frame 4. Accordingly, it is possible to prevent the first end 21 that is hooked on the hooking portion 41 from detaching from the hooking portion 41. Each of the hooking portions 41 is configured to be movable to the center of the seatback frame 4.

The occupant restraining device 100 further includes guide grooves 43. On the short side frame 46, guide grooves 43 are provided for guiding each of the hooking portions 41 to the center of the seatback frame 4. The guide groove 43 extends along the longitudinal direction of the short side frame 46 from each end of the short side frame 46 and extending to the middle section (center of the seatback frame 4) of the frame 46. The lower end part of the hooking portion 41 slides in the guide groove 43 with the lower end part of the contact part 411 engaged with the guide groove 43, and slides within the guide groove 43.

The occupant restraining device 100 further includes a biasing member 44 that biases the hooking portion 41 toward the center of the seatback frame 4. The biasing member 44 comprises, for example, a pretensioner or a retractor, and pulls the hooking portion 41 to the center of the seatback frame 4. The biasing member 44 instantaneously pulls the hooking portion 41 at the same time as the expansion and deployment of the airbag 3, or immediately after the start of the expansion and deployment, to the center of the seatback frame 4.

As described above, in the occupant restraining device 100 according to the present invention, at the same time as the expansion and deployment of the airbag 3, or immediately after the start of the expansion and deployment, the biasing member 44 instantaneously pulls the hooking portion 41 to the center of the seatback frame 4. As a result, the hooking portion 41 moves to the center of the seatback frame 4 with the first end 21 being hooked. Accordingly, the position and pulling direction of the tension band 2 can be changed to bring the expanding and deploying airbag 3 to the center of the seatback frame 4, that is, to the occupant side.

Figure 4:
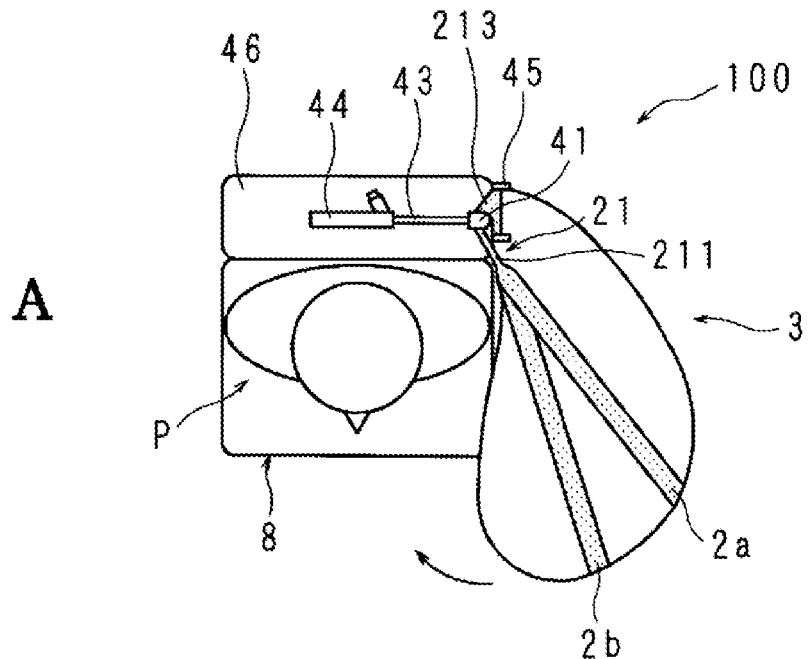
FIG. 4 is an explanatory diagram of the action of the tension band in the occupant restraining device according to the present invention.
Figure 4:
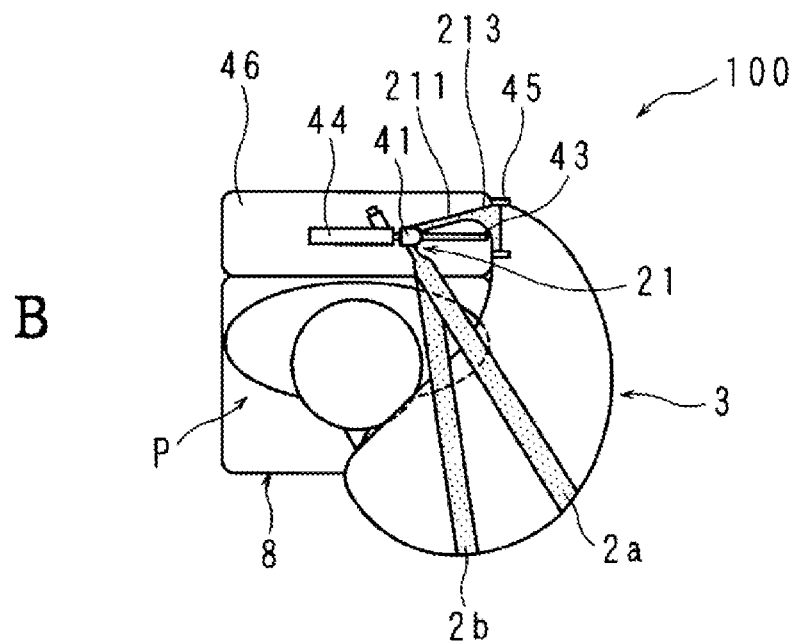

FIG. 4 is an explanatory diagram of the action of the tension band 2 in the occupant restraining device 100 according to the present invention. In FIG. 4, the state in which the occupant P is seated in the seat is illustrated from the upper side. FIG. 4A illustrates the initial stage of expansion and deployment of the airbag 3, and FIG. 4B illustrates the completion of expansion and deployment of the airbag 3.

As illustrated in FIG. 4A, in the initial stage of expansion and deployment of the airbag 3, the airbag 3 deploys at a position slightly away from the occupant P. In this case, the front side of the occupant P is open.

However, at the same time as or immediately after deployment, the biasing member 44 is instantaneously activated to pull the hooking portion 41. As a result, the hooking portion 41 is pulled toward the center of the seatback frame 4, and the two tension bands 2a and 2b are pulled toward the center of the seatback frame 4. That is, the positions and directions of the two tension bands 2a and 2b are changed to the direction of narrowing the spacing between the occupant P and the two tension bands 2a and 2b. As a result, as illustrated in FIG. 4B, the airbag 3 is drawn toward the occupant P and a portion of the airbag 3 is positioned in front of the occupant P. Therefore, the airbag 3 can surround the front side as well as the left side (right side) of the occupant P, and the occupant P is securely restrained by the airbag 3.

For convenience of explanation, FIG. 4 illustrates a case in which only the airbag 3 on the left side of the occupant P is expanded and deployed, but not limited thereto, and it goes without saying that the airbag 3 on the right side of the occupant P may also inflate and deploy at the same time if necessary.

Figure 5:
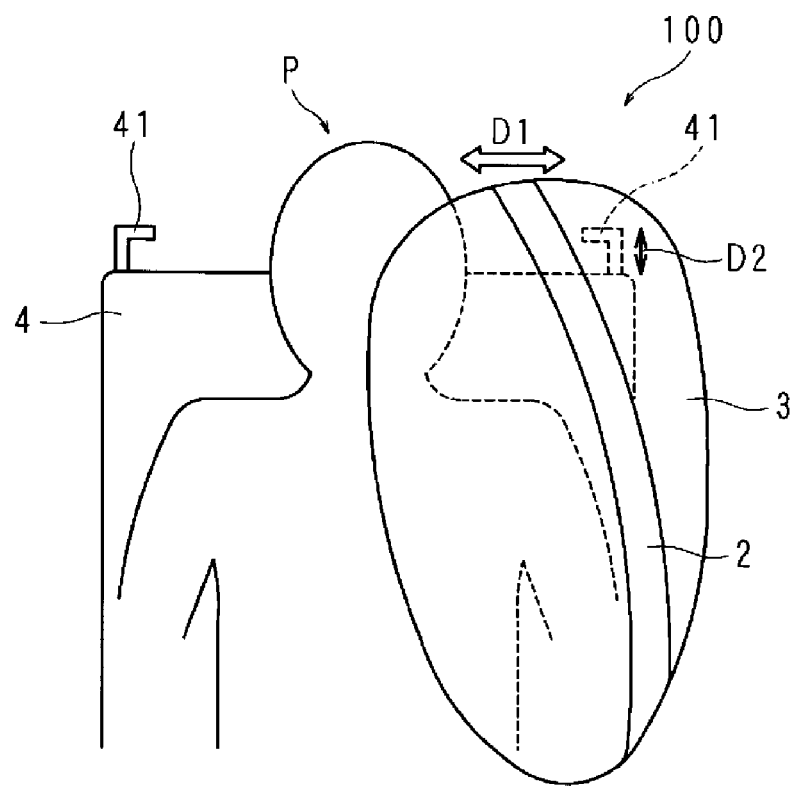
FIG. 5 is a diagram illustrating the positional relationship between an airbag that expands and deploys and a hooking portion in the occupant restraining device according to the present invention.

FIG. 5 is a diagram illustrating the positional relationship between the expanding and deploying airbag 3 and the hooking portion 41 in the occupant restraining device 100 according to the present invention. For convenience of explanation, the seatback frame 4 and the occupant P are partially illustrated, the hooking portion 41 is illustrated in outline, and only the left side airbag 3 is illustrated as expanded and deployed. In FIG. 5, only one of the two tension bands 2a and 2b is illustrated.

As can be seen from FIG. 5, the direction D1 (white arrow in FIG. 5) along the surface of the expanding and deploying airbag 3 is orthogonal to the protruding direction D2 of the hooking portion 41. Accordingly, there are concerns of using a conventional tension band, where the tension band could be twisted by the hooking portion 41 when the hooking portion 41 moves, entangling the tension band, thereby not coming into sufficient contact with the hooking portion 41, which disallows suitable adjustment of the tension band.

In contrast, regarding the occupant restraining device 100 according to the present invention, the first end 21 (tension band 2) has a twisting portion 211, and as described above, the twisting portion 211 is in a position where the width direction is twisted with respect to the second portion. Accordingly, regarding the tension band 2, the direction along the surface of the twisting portion 211 corresponds to the protruding direction D2 of the hooking portion 41, and the direction along the surface of the second portion (for example, the second wide portion 214) corresponds to the direction D1 along the surface of the expanding and deploying airbag 3.

Therefore, entanglement of the first end 21 upon moving the hooking portion 41 can be prevented, ensuring surface contact between the hooking portion 41 and the first end 21, allowing for more reliable adjustment of the position and direction (pulling direction) of the tension band 2.

Furthermore, regarding the occupant restraining device 100 of the present invention, while the width of the second wide portion 214 is made wide, only the width of the twisting portion 211 is made narrow. Accordingly, the second wide portion 214 can reliably pull the airbag 3 toward the occupant P side, and the contact area between the twisting portion 211 and the hooking portion 41 (contact part 411) can be reduced, friction can be reduced, thereby allowing for quicker movement of the hooking portion 41.

In addition, in conjunction with the twisting portion 211, the dimensions of the hooking portion 41 (contact part 411) in the protrusion direction D2 can be reduced, and damage to the hooking portion 41 by an external force applied during expansion and deployment of the airbag 3 can be prevented.

The occupant restraining device 100 of the present invention is not limited to the above description.

A roller may be attached to the contact part 411 of the hooking portion 41, the contact part 411 alone may be configured to be rotatable, and the contact part 411 may be configured to be a rotatable cylindrical shape. This configuration further reduces the friction between the first end 21 and the hooking portion 41 when the hooking portion 41 moves.

Embodiment 2

Regarding the occupant restraining device 100 of embodiment 2, on the first end 21 of the tension band 2, the twisting portion 211, first wide portion 213, and second wide portion 214 are each made of different members.

Figure 6:
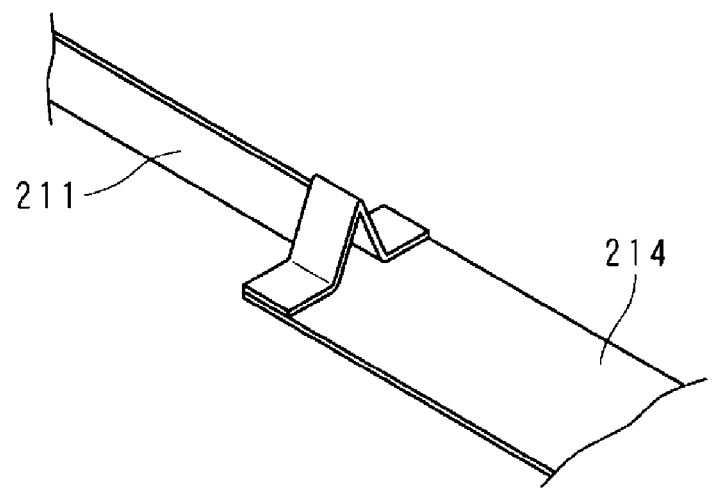
FIG. 6 is an illustrative diagram of an example of the first end of the occupant restraining device according to Embodiment 2.

FIG. 6 is an illustrative diagram of an example of the first end 21 of the occupant restraining device 100 according to Embodiment 2. In FIG. 6, for convenience of explanation, the connecting part of the twisting portion 211 and the second wide portion 214 is illustrated.

As illustrated in FIG. 6, a twisting portion 211 is connected to the second wide portion 214 in a direction that intersects the direction along the surface of the second wide portion 214. The twisting portion 211 is, for example, composed of two pieces and has a strip shape. The first end of the twisting portion 211 is sewn to an end of the second wide portion 214. Although not shown, the second end portion of the twisting portion 211 is also sewn, in the direction along the surface thereof, to the end portion of the first wide portion 213 in a direction orthogonal to the surface along the first wide portion 213.

Thereby, regarding the occupant restraining device 100 according to embodiment 2, similar to embodiment 1, the twisting portion 211 is in a position where the width direction is twisted with respect to the second portion. Therefore, regarding the tension band 2, the direction along the surface of the twisting portion 211 corresponds to the protruding direction D2 of the hooking portion 41, (see FIG. 5), and the direction along the surface of the second portion corresponds to the direction D1 along the surface of the expanding and deploying airbag 3 (see FIG. 5).

Since the width of the second wide portion 214 is wide, the airbag 3 can be reliably brought to the occupant P side. In addition, as the width of the twisting portion 211 is narrow, entanglement of the first end 21 can be prevented in the case the hooking portion 41 moves, moreover, surface contact between the hooking portion 41 and the first end 21 can be ensured, allowing for reliable adjustment of the position and direction of the tension band 2. Further, friction with the hooking portion 41 (contact part 411) can be reduced, and the dimensions of the hooking portion 41 (contact part 411) in the protrusion direction D2 can be reduced.

Embodiment 3

Figure 7:
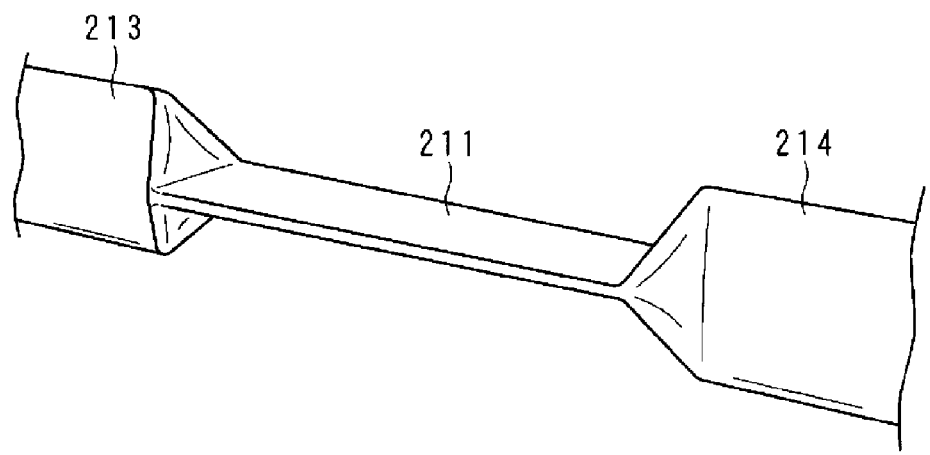
FIG. 7 is an illustrative diagram of an example of the first end of the occupant restraining device according to Embodiment 3.

FIG. 7 is an illustrative diagram of an example of the first end 21 of the occupant restraining device 100 according to Embodiment 3. In FIG. 7, for convenience of explanation, the connecting part of the twisting portion 211 and the second wide portion 214 is illustrated.

Regarding the occupant restraining device 100 according to embodiment 3, at least the first end 21 of the tension band 2 is formed from a single cylindrical material. That is, regarding the occupant restraining device 100 of embodiment 3, the twisting portion 211, the first wide portion 213, and second wide portion 214 have a two-sheet structure formed by folding a single cylindrical material flat. Accordingly, the twisting portion 211, the first wide portion 213, and the second wide portion 214 are rectangular and all have the same dimensions in the width direction.

The twisting portion 211 is in a position where the width direction is twisted with respect to the second portion. That is, the twisting portion 211 and the first wide portion 213 are provided in different directions along the respective surfaces. The direction along the surface of the twisting portion 211 and the direction along the surface of the first wide portion 213 intersect (for example, orthogonally). In addition, the direction along the surface of the twisting portion 211 and the direction along the surface of the second wide portion 214 intersect (for example, orthogonally).

Therefore, the thickness direction in the twisting portion 211 intersects the thickness direction in the first wide portion 213 and the second wide portion 214. Also The thickness directions in the first wide portion 213 and the second wide portion 214 are parallel.

In addition, a seam may be formed at least at one location along the width direction or to intersect the width direction of the twisting portion 211, the first wide portion 213, and the second wide portion 214, to maintain their shapes.

Thereby, the occupant restraining device 100 according to embodiment 3 is similar to that of embodiment 1, where for the tension band 2, the direction along the surface of the twisting portion 211 corresponds to the protruding direction D2 of the hooking portion 41, (see FIG. 5), and the direction along the surface of the second portion corresponds to the direction D1 along the surface of the expanding and deploying airbag 3 (see FIG. 5).

Therefore, entanglement of the first end 21 can be prevented in the case the hooking portion 41 moves; moreover, surface contact between the hooking portion 41 and the first end 21 can be ensured, allowing for reliable adjustment of the position and direction of the tension band 2.

Further, regarding the occupant restraining device 100 of embodiment 3, as described above, the twisting portion 211, the first wide portion 213, and second wide portion 214 are formed of a single cylindrical material, such that the manufacturing process can be simplified and configurations can be simplified.

REFERENCE NUMERALS

1: Airbag module
2: Tension band
3: Airbag
4: Seatback frame
21: First end
41: hooking portions
43: Guide grooves
44: Biasing member
100: Occupant restraining device
211: Twisting portion
213: First wide portion
214: Second wide portion

The invention claimed is:

1. An occupant restraining device, the occupant restraining device comprising:
   an airbag for installation in a seatback frame of a seat of a vehicle,
   a band for biasing the airbag towards an occupant sitting in the seat, the band including a first end attachable to an upper portion of the seatback frame and a second end attachable to a mounting portion of a seat frame of the seat,
   wherein the first end of the band includes a first portion proximate an endmost portion of the first end, a second portion, and a narrowed portion between the first portion and the second portion, the narrowed portion being smaller than the first portion and the second portion in a width direction that is perpendicular to a thickness of the band.

2. The occupant restraining device according to claim 1 in combination with the seat of the vehicle, wherein:
   the seatback frame is provided with a hooking portion, the first-narrowed portion hooked to the hooking portion, the hooking portion operable to change a pulling direction of the band, and
   the narrowed portion in contact with the hooking portion.

3. The occupant restraining device according to claim 2, wherein:
   the hooking portion is moveably mounted on the upper portion of the seatback frame for enabling movement of the hooking portion in a lateral direction relative to a center of the seatback frame.

4. The occupant restraining device according to claim 1 in combination with the seat of the vehicle, wherein:
   the narrowed portion of the first end of the band is a twisted portion such that a first width of the band at the narrowed portion is twisted relative to a second width of the band at the first portion of the first end.

5. The occupant restraining device according to claim 4, wherein:
   the band is folded along a longitudinal direction at the twisted portion.

6. The occupant restraining device according to claim 1, wherein:
   the first portion is formed from a single cylindrical material.

7. The occupant restraining device according to claim 1 in combination with the seat of the vehicle, wherein the first end of the band is mounted to the seatback frame such that a first width of the band at the first portion of the first end extends in a front to back direction of the seat of the vehicle and a second width of the band at the narrowed portion is a twisted portion that is twisted relative to the first width.

8. The occupant restraining device according to claim 7 in combination with the seat of the vehicle, wherein the seatback frame includes an upwardly extending hook portion about which the first end of the band extends such that the twisted portion engages the hook portion.

9. The occupant restraining device according to claim 1, wherein the narrowed portion of the band includes at least two folds sewn into the first end.

10. An occupant restraining device in combination with a seat of a vehicle, the seat including a seatback frame and a seat frame, the occupant restraining device comprising:

an airbag carried by the seatback frame; and a band for biasing the airbag towards an occupant sitting in the seat, the band including a first end attached to an upper portion of the seatback frame and a second end attached to a mounting portion of a seat frame of the seat, wherein the first end of the band includes a first portion proximate an endmost portion of the first end, a second portion, and a narrowed portion between the first portion and the second portion, the narrowed portion being smaller than the first portion and the second portion in a width direction that is perpendicular to a thickness of the band, and wherein the first end of the band is mounted to the seatback frame such that a first width of the band at the first portion of the first end extends in a front to back direction of the seat of the vehicle and a second width of the band at the narrowed portion is a twisted portion that is twisted relative to the first width.

11. The occupant restraining device according to claim 10 in combination with the seat of the vehicle, wherein the seatback frame includes an upwardly extending hook portion about which the first end of the band extends such that the twisted portion engages the hook portion.

* * * * *